United States Patent
Hirose

(10) Patent No.: US 11,563,884 B2
(45) Date of Patent: Jan. 24, 2023

(54) FOCUS DETECTION APPARATUS, IMAGING APPARATUS, AND FOCUS DETECTION METHOD

(71) Applicant: CANON KABUSHIKI KAISHA, Tokyo (JP)

(72) Inventor: Minoru Hirose, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/751,385

(22) Filed: Jan. 24, 2020

(65) Prior Publication Data
US 2020/0252551 A1 Aug. 6, 2020

(30) Foreign Application Priority Data
Jan. 31, 2019 (JP) .............................. JP2019-015403

(51) Int. Cl.
*H04N 5/232* (2006.01)

(52) U.S. Cl.
CPC ... *H04N 5/232127* (2018.08); *H04N 5/23254* (2013.01)

(58) Field of Classification Search
CPC ......... H04N 5/232127; H04N 5/23254; H04N 5/23212; H04N 5/232122
See application file for complete search history.

(56) References Cited

U.S. PATENT DOCUMENTS

| | | | | |
|---|---|---|---|---|
| 5,097,282 A | * | 3/1992 | Itoh | G02B 7/34 396/123 |
| 5,905,919 A | * | 5/1999 | Ide | G02B 7/346 396/104 |
| 2004/0125229 A1 | * | 7/2004 | Aoyama | H04N 5/23212 348/345 |
| 2008/0055457 A1 | * | 3/2008 | Nakahara | H04N 5/23212 348/335 |

(Continued)

FOREIGN PATENT DOCUMENTS

| CN | 101583902 A | 11/2009 |
|---|---|---|
| CN | 102402103 A | 4/2012 |

(Continued)

OTHER PUBLICATIONS

Sep. 14, 2021 Chinese Office Action, which is enclosed with an English Translation, that issued in Chinese Patent Application No. 202010078911.1.

*Primary Examiner* — Jason A Flohre
(74) *Attorney, Agent, or Firm* — Cowan, Liebowitz & Latman, P.C.

(57) ABSTRACT

A focus detection apparatus includes a selection unit configured to select as the focus detection area a first focus detection area and a second focus detection area including the first focus detection area and its periphery, and an information acquiring unit configured to acquire first information on whether or not the object moving within the imaging screen can be continuously captured in the first focus detection area. The selection unit selects the first focus (Continued)

detection area when the first information indicates that the object can be continuously captured in the first focus detection area, and the selection unit selects the second focus detection area when the first information indicates that the object cannot be continuously captured.

10 Claims, 10 Drawing Sheets

(56) References Cited

U.S. PATENT DOCUMENTS

| | | | |
|---|---|---|---|
| 2010/0013981 A1* | 1/2010 | Yasuda | H04N 5/23212 348/345 |
| 2012/0057062 A1* | 3/2012 | Hamada | H04N 5/232945 348/333.02 |
| 2012/0218456 A1* | 8/2012 | Sweet, III | H04N 5/232127 348/345 |
| 2015/0055011 A1* | 2/2015 | Aoki | G02B 7/34 348/353 |
| 2018/0027172 A1* | 1/2018 | Akaguma | H04N 5/36961 348/345 |
| 2018/0063415 A1* | 3/2018 | Hongu | H04N 5/23212 |
| 2020/0409026 A1* | 12/2020 | Fujiki | G02B 7/04 |

FOREIGN PATENT DOCUMENTS

| | | | |
|---|---|---|---|
| CN | 103535021 A | | 1/2014 |
| CN | 107645632 A | | 1/2018 |
| JP | 02-093419 A | | 4/1990 |
| JP | 2001-021794 A | | 1/2001 |
| KR | 20090062577 A | * | 6/2009 |
| KR | 20090062577 A | | 6/2009 |

* cited by examiner

FOCUS DETECTION APPARATUS, IMAGING APPARATUS, AND FOCUS DETECTION METHOD

BACKGROUND OF THE INVENTION

Field of the Invention

The present invention relates to an autofocus (AF) technology in an imaging apparatus, such as a digital camera.

Description of the Related Art

The AF in the imaging apparatus can provide a focus detection and drives a focus lens based on the focus detection result with an AF area (focus detection area) arbitrarily set by the user as an area to be focused on in an imaging screen. It is difficult for the user to move (pan) the imaging apparatus so as to keep the AF area for the moving object. When the AF area shifts from the object, the background may be focused (object missing) or the focus fluctuation caused by a perspective conflict may occur.

Japanese Patent Laid-Open No. ("JP") 02-093419 discloses a method of setting a small (narrow) AF area when determining that the object is not a moving object, and a large (wide) AF area when determining that the object is a moving object. JP 2001-021794 discloses a method for predicting a future focus position on a moving object.

However, when the AF area is made wider when the object is the moving object as in the method disclosed in JP 02-093419, the perspective conflict may occur or it becomes difficult to accurately focus on a small object or part of the object. Even if the future focus position is predicted as disclosed in JP 2001-021794, the AF area to be focused cannot be specified when the prediction fails.

SUMMARY OF THE INVENTION

The present invention provides a focus detection apparatus and the like that can perform a stable focus detection by suppressing object missing and a perspective conflict for a moving object.

A focus detection apparatus according to one aspect of the present invention is configured to perform a focus detection of an object captured in a focus detection area in an imaging screen. The focus detection apparatus includes a selection unit configured to select as the focus detection area a first focus detection area and a second focus detection area including the first focus detection area and its periphery; and an information acquiring unit configured to acquire first information on whether or not the object moving within the imaging screen can be continuously captured in the first focus detection area. The selection unit selects the first focus detection area when the first information indicates that the object can be continuously captured in the first focus detection area, and the selection unit selects the second focus detection area when the first information indicates that the object cannot be continuously captured. At least one processor or circuit is configured to perform a function of at least one of the units.

A focusing apparatus and an imaging apparatus having the above focus detection apparatus, a focus detection method corresponding to the above focus detection apparatus, and a storage medium storing a program corresponding to the focus detection method also constitute another aspect of the present invention.

Further features of the present invention will become apparent from the following description of exemplary embodiments with reference to the attached drawings.

BRIEF DESCRIPTION OF THE DRAWINGS

FIGS. 1A to 11C illustrate first and second AF areas in an imaging screen.

DESCRIPTION OF THE EMBODIMENTS

Figure 1:
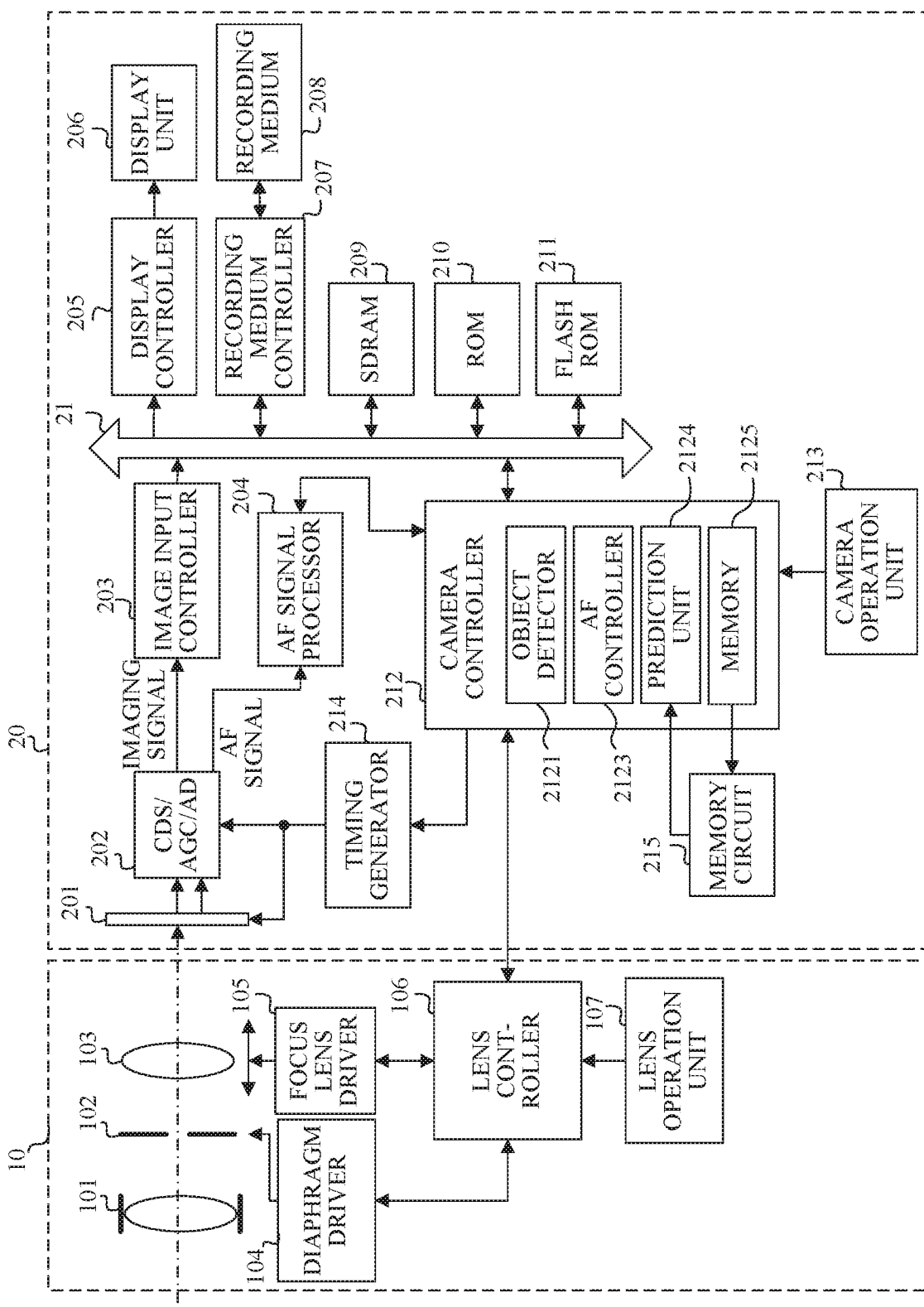
FIG. 1 is a block diagram illustrating a configuration of a camera system including a lens interchangeable type digital camera having a focusing apparatus according to a first embodiment of the present invention.

Referring now to the accompanying drawings, a description will be given of embodiments according to the present invention. FIG. 1 illustrates a configuration of a camera system that includes a lens interchangeable type digital camera (referred to as a camera body hereinafter) 20 serving as an imaging apparatus according to one embodiment of the present invention and an interchangeable lens unit (simply referred to as a lens unit hereinafter) 10 that is detachably attached to the camera body 20.

The lens unit 10 includes an imaging optical system that forms an object image by forming light from an unillustrated object, and a lens controller 106 that includes a CPU or the like and controls all operations (processing) of the lens unit 10. The imaging optical system includes a fixed lens 101, a diaphragm (aperture stop) 102, and a focus lens 103 in order from the object side to the image side.

The diaphragm 102 is driven by a diaphragm driver 104 so as to change its aperture diameter, and controls a light amount incident on an image sensor 201 described later. The focus lens 103 is driven in the optical axis direction by a focus lens driver 105 for focusing. The aperture driver 104 and the focus lens driver 105 are controlled by the lens controller 106.

In the lens unit 10, a lens operation unit 107 includes an operation member used for the user to set the operation of the lens unit 10, such as switching between the AF (autofocus) and the MF (manual focus), and turning on and off the image stabilization operation. The lens controller 106 performs a control according to the operation of the lens operation unit 107.

The lens controller 106 can communicate with a camera controller 212 provided in the camera body 20. The lens controller 106 controls the diaphragm driver 104 and the focus lens driver 105 according to the control command and control information received from the camera controller 212, and transmits lens optical information and other lens information of the lens unit 10 to the camera controller 212.

In the camera body 20, the image sensor 201 includes a CCD sensor or a CMOS sensor, and photoelectrically converts (captures) an object image formed by a light beam that has passed through the imaging optical system. The image sensor 201 outputs a phase difference AF signal and an imaging signal described below according to a timing signal output from a timing generator 214 in accordance with the command from the camera controller 212.

Figure 2:
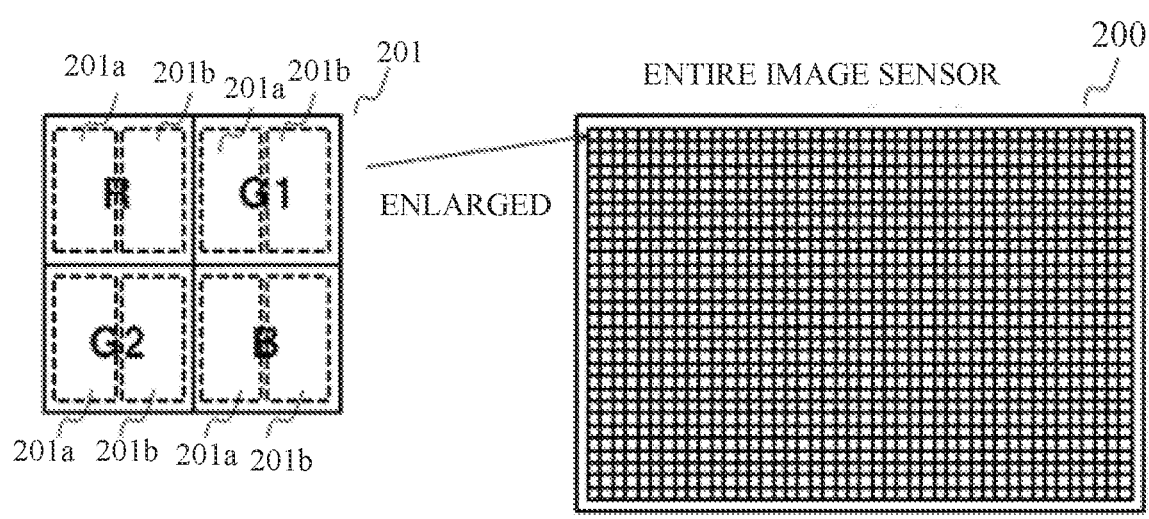
FIG. 2 illustrates a pixel array of an image sensor for imaging surface phase difference AF in the camera.

FIG. 2 illustrates a configuration of the image sensor 201 used in this embodiment. FIG. 2 illustrates the entire image sensor 201 and enlarged part of the image sensor 201. A plurality of R, G, and B pixels are arranged on the image sensor 201 in a Bayer array. Each pixel includes a pair of photoelectric converters (sub-pixels) 201$a$ and 201$b$ that are divided into two in the horizontal direction, and a single common microlens 201$c$. The light beams that have passed through different regions of the exit pupil of the imaging optical system enter the pair of sub-pixels 201$a$ and 201$b$ through the microlens 201$c$. Thereby, a pupil division is performed. Each of the pair of sub-pixels 201$a$ and 201$b$ outputs an A signal and a B signal by photoelectrically converting the incident light beam. Then, the image sensor 201 combines A and B signals from a plurality of pixels included in an AF area described later, and outputs an A image signal and a B image signal as a pair of phase difference AF signals. A pixel that outputs the A image signal and the B image signal is referred to as a focus detection pixel. The image sensor 201 adds the A image signal and the B image signal to each other and outputs an image signal (A+B signal).

A CDS/AGC/AD converter 202 performs correlated double sampling, a gain control, and an AD conversion for removing a reset noise for the phase difference AF signal and the imaging signal output from the image sensor 201. The converter 202 outputs the phase difference AF signal and the imaging signal that have received these processing to an AF signal processor 204 and an image input controller 203, respectively.

The AF signal processor 204 performs a correlation operation for a pair of phase difference AF signals (A image signal and B image signal), and calculates a phase difference (referred to as an image shift amount hereinafter) which is a shift amount between the A image signal and the B image signal, and the reliability thereof (hereinafter referred to as a focus detection reliability). This embodiment calculates the focus detection reliability using a two-image coincidence degree described later and the steepness of the correlation change amount. In addition, the AF signal processor 204 sets the position and size of an AF area (focus detection area) that is an area to be focused by the AF in the imaging screen. The AF signal processor 204 outputs information on the image shift amount and the focus detection reliability to the camera controller 212. Details of the processing performed by the AF signal processor 204 will be described later.

An AF controller (control unit) 2123 in the camera controller 212 calculates a defocus amount of the imaging optical system using the information of the image shift amount and the focus detection reliability from the AF signal processor 204. Then, it transmits a focus control command including information on a driving amount of the focus lens 103 converted from the defocus amount to the lens controller 106. The lens controller 106 controls the focus lens driver 105 so as to drive the focus lens 103 by the received driving amount. Thereby, the image plane position moves so that a focused object image is formed on the image sensor 201. The image plane position where a focused object image is formed on the image sensor 201 is referred to as an in-focus image plane position. The AF signal processor 204 and the camera controller 212 constitute a focus detection apparatus and a focusing apparatus.

FIG. 2 illustrates the sub-pixels in each pixel divided into two in the horizontal direction, but the sub-pixel may be divided into two in the vertical direction, or each pixel is divided into two in each of the horizontal and vertical directions (totally four divisions).

An image input controller 203 stores the imaging signal output from the converter 202 as an image signal in an SDRAM 209 via a bus 21. The image signal stored in the SDRAM 209 is read out by a display controller 205 via the bus 21 and displayed on a display unit 206 provided on the back surface of the camera body 20. In the image recording mode for recording the image signal, the image signal stored in the SDRAM 209 is recorded on a recording medium 208 such as a semiconductor memory by a recording medium controller 207.

A ROM 210 stores a computer program and various data for the camera controller 212 to execute a control and processing. A flash ROM 211 stores various setting information on the operation of the camera 20 set by the user.

A camera operation unit 213 includes an operation member such as a main switch for powering on and off the camera body 20, an imaging preparation switch for starting AF/AE processing, and an imaging start switch for starting image recording processing. The operation member further includes a reproduction switch for performing reproduction processing of the captured image generated and recorded by the image recording processing, a dial for various camera settings, and the like. The camera operation unit 213 outputs an operation signal corresponding to a user operation on these operation members to the camera controller 212.

An object detector 2121 in the camera controller 212 detects a specific object from the imaging signal input from the image input controller 203, and determines the position of the specific object in the imaging signal (image). The specific object is a face of a person existing in the imaging screen, an object existing at a position designated by the user through the camera operation unit 213, or the like. In addition, the object detector 2121 determines whether the specific object is a moving body or a stationary body according to whether or not the position of the specific object has changed in a plurality of frames of the imaging signal continuously input from the image input controller 203. Then, when the specific object is the moving object, the object detector 2121 obtains information on the position and size of the specific object and the moving amount that is the difference between the pre-movement position and the post-movement position. Information on the position, size, and moving amount of the specific object is mainly used to set an AF area.

A memory 2125 causes a memory circuit 215 to store an in-focus image plane position calculated from the defocus amount and the acquisition time (focus detection time) of the A and B image signals for calculating the defocus amount.

The camera controller 212 controls respective components while exchanging information with them in the camera body 20. The camera controller 212 executes power on and off, the AF/AE processing, image recording processing, and recorded image reproduction processing, and changes various camera settings in response to an operation signal from the camera operation unit 213. The camera controller 212 transmits various control commands for the lens unit 10 (lens controller 106) and information on the camera body 20 to the lens controller 106, and acquires information on the lens unit 10 from the lens controller 106. The camera controller 212 includes a microcomputer and controls the entire camera system by executing a computer program stored in the ROM 210.

Figure 3:
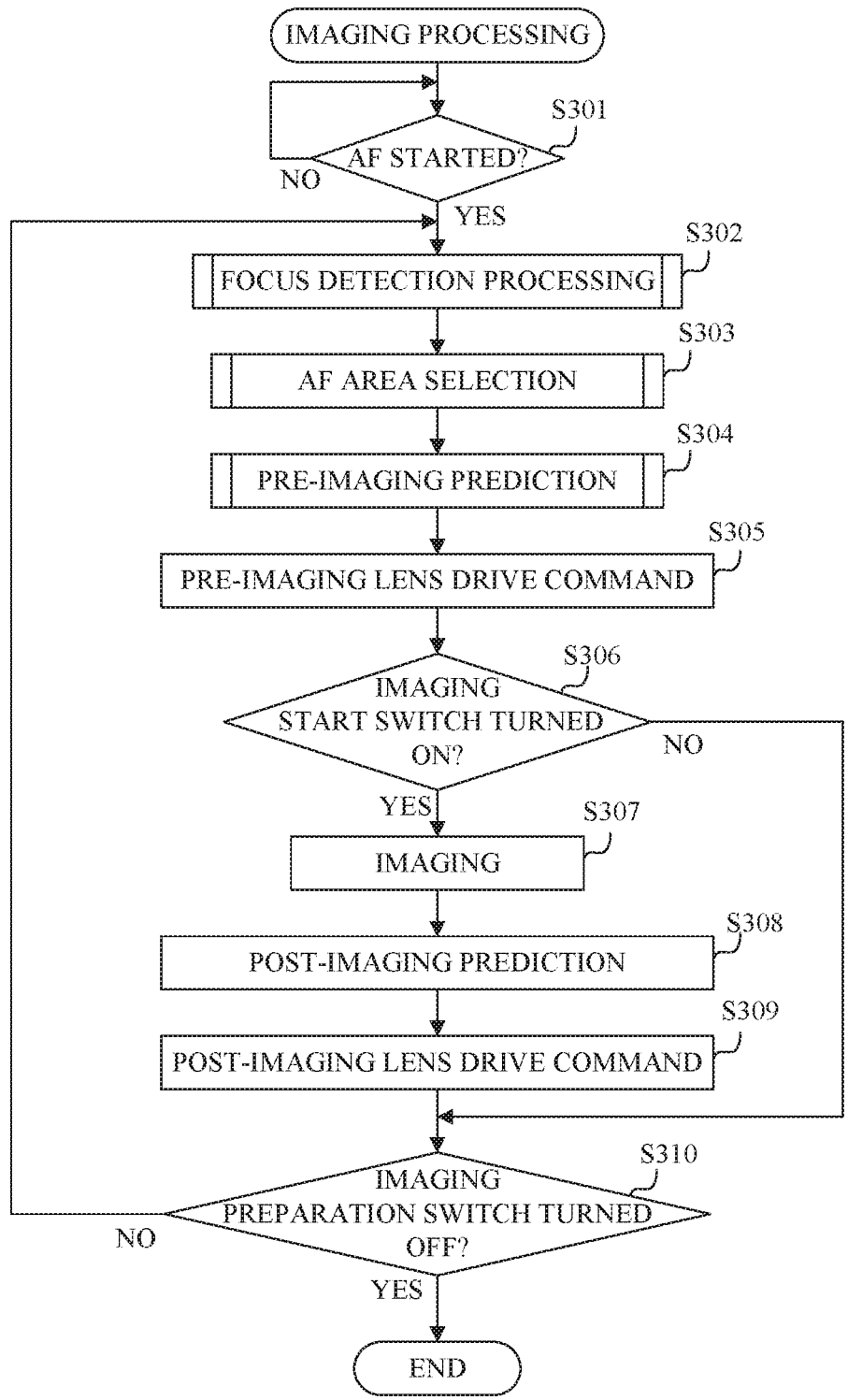
FIG. 3 is a flowchart illustrating imaging processing in the first embodiment.

A description will be given of processing performed by the camera controller 212. The camera controller 212 performs the following processing according to an imaging processing program that is a computer program stored in the ROM 210. A flowchart in FIG. 3 illustrates the imaging processing including an AF operation for performing the focusing control. S stands for the step.

First, in S301, the camera controller 212 determines whether or not to start the AF operation depending on whether or not the imaging preparation switch of the camera operation unit 213 is turned on. In executing the AF operation, the camera controller 212 proceeds to S302 and performs the focus detection processing. Details of the focus detection processing will be described later.

Next, in S303, the camera controller 212 as the selection unit performs AF area selection processing for selecting a first AF area (first focus detection area) or a second AF area (second focus detection area) as an AF area (referred to as "use AF area" hereinafter) that is used as an area for allowing the user to capture the object in the AF operation on the imaging screen. More specifically, the camera controller 212 selects the first AF area or the second AF area as the use AF area by determining whether or not the object can be captured (included) in the first AF area and the focus detection reliability is high as the reliability of the image shift amount detected in the first AF area. Details of the AF area selection processing will be described later.

Next, in S304, the camera controller 212 performs pre-imaging prediction processing. More specifically, if the imaging start switch is turned on, the camera controller 212 causes the prediction unit 2124 to predict the in-focus image plane position from the detection time of the image shift amount in the focus detection processing in S302 for the AF area selected in S303 to the image recording processing. If the imaging start switch is turned off, the prediction unit 2124 is caused to predict the in-focus image plane position to the next image shift amount. Details of the prediction method of the in-focus image plane position by the prediction unit 2124 will be described later.

In S305, the camera controller 212 calculates the driving amount of the focus lens 103 to move the image plane position to the in-focus image plane position predicted in S304 and transmits it to the lens controller 106.

Next, in S306, the camera controller 212 determines whether or not the imaging start switch is turned on, proceeds to S307 if it is turned on, and proceeds to S310 if not.

In S307, the camera controller 212 performs the image recording processing, and stores the captured image obtained thereby in the memory circuit 215. In S308, the camera controller 212 causes the prediction unit 2124 to predict the in-focus image plane position when the next image shift amount is detected. More subsequently, in S309, the camera controller 212 calculates the driving amount of the focus lens 103 to move the image plane position to the in-focus image plane position predicted in S308, and transmits it to the lens controller 106. Then, the camera controller 212 proceeds to S310.

In S310, the camera controller 212 determines whether or not the imaging preparation switch is turned off, ends the flow if the switch is turned off, and returns to S302 and repeats the above processing if the switch is turned on.

Figure 11A:
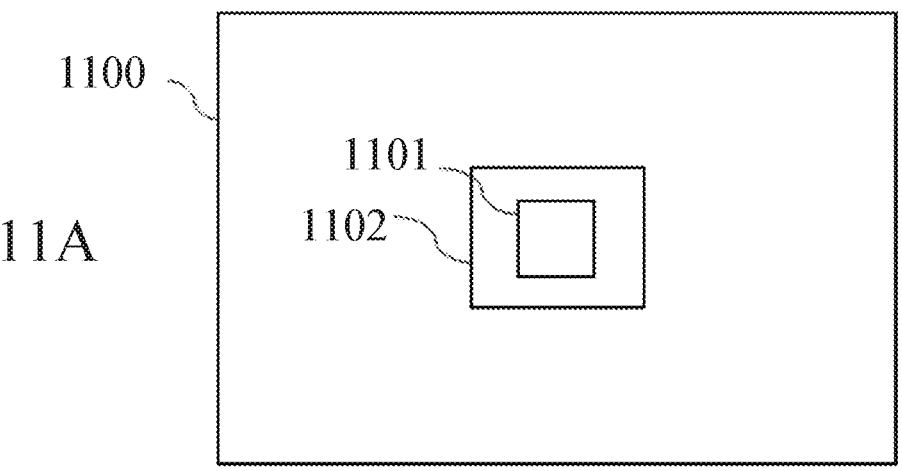

FIG. 11A illustrates a first AF area 1101 and a second AF area 1102 set on the image sensor 201 (in the imaging screen 1100). When the AF operation is performed, an AF frame is displayed on the display unit 206 so that it overlaps the live-view image observed by the user. The first AF area 1101 has the same size as this AF frame. The second AF area 1102 includes the first AF area 1101 and its periphery, and is an area wider than the first AF area 1101.

Figure 11B:
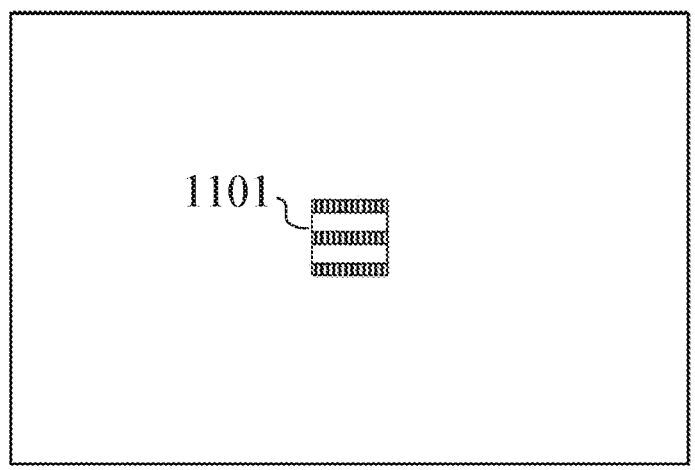
Figure 11C:
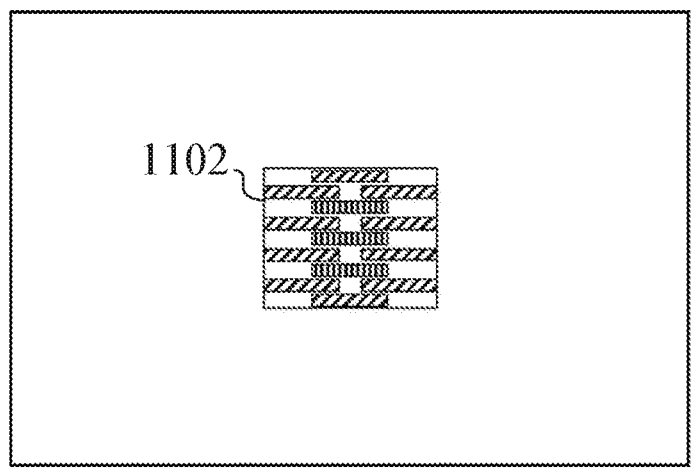

In FIG. 11B, each of the three areas with vertical stripes is a first focus detection pixel column arranged in the first pixel area corresponding to the first AF area 1101 in the image sensor 201, in which a plurality of focus detection pixels for reading out the phase difference AF signals are arranged in the horizontal direction. In FIG. 11C, each of the ten areas with diagonal stripes is a second focus detection pixel column arranged in the second pixel area corresponding to the second AF area 1102 in the image sensor 201, in which a plurality of focus detection pixels for reading out the pair of phase difference AF signals are arranged in the horizontal direction. The second pixel area further includes the three first focus detection pixel columns. Part of the ten second focus detection pixel columns is arranged between the three first focus detection pixel columns in the first pixel area. In other words, a portion in the first pixel area in the second pixel area includes the second focus detection pixel column different from the first focus detection pixel column.

The second focus detection pixel column has the same horizontal size (length) as the first focus detection pixel column. Each focus detection pixel column may have a size that hardly causes the perspective conflict in capturing a small object or part of the object. The positions and sizes of the first and second pixel areas and the focus detection pixel columns illustrated in FIGS. 11A to 11C are merely illustrative, and other positions and sizes may be used.

Figure 4:
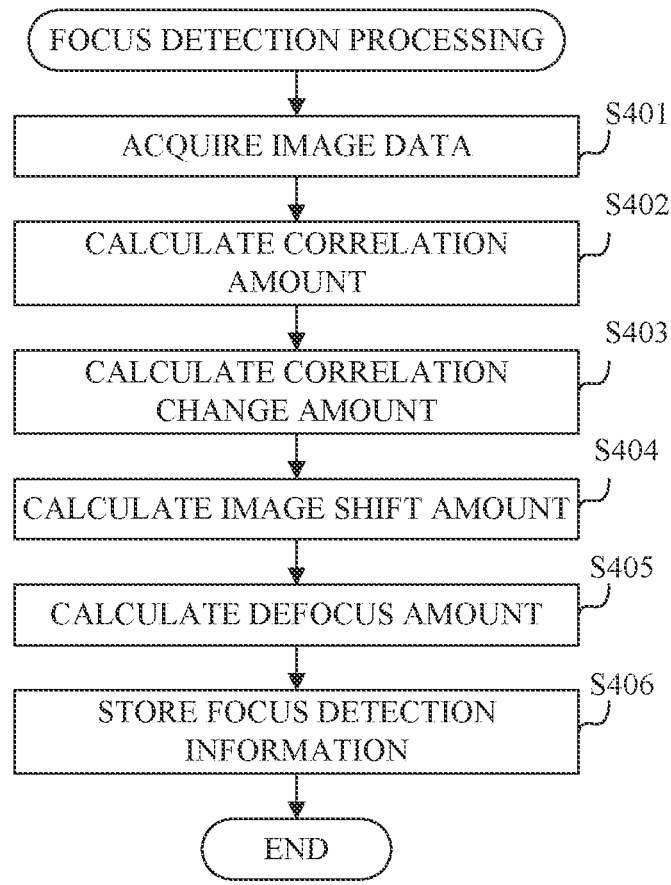
FIG. 4 is a flowchart illustrating focus detection processing in imaging processing.

A flowchart in FIG. 4 illustrates the focus detection processing performed in S302 in the imaging processing illustrated in FIG. 3. In S401, the AF signal processor 204 acquires a pair of phase difference AF signals, i.e., the A image signal and the B image signal, from the focus detection pixel row in the pixel area corresponding to the AF area in the image sensor 201.

Figure 5:
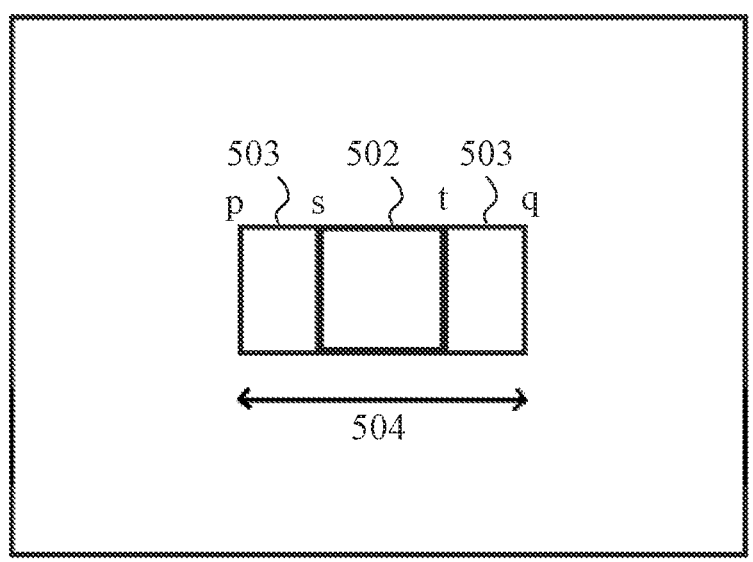
FIG. 5 illustrates an AF area.
Figure 6A:
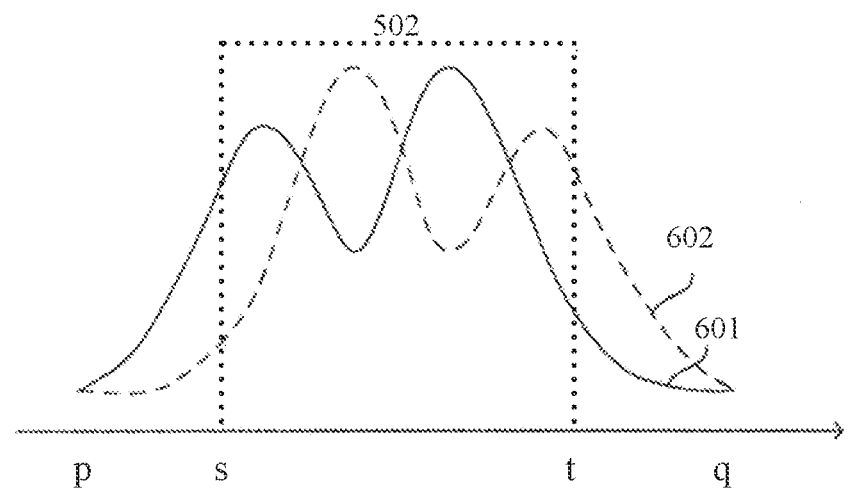
FIGS. 6A to 6C explain a pair of phase difference AF signals in the focus detection processing.
Figure 6B:
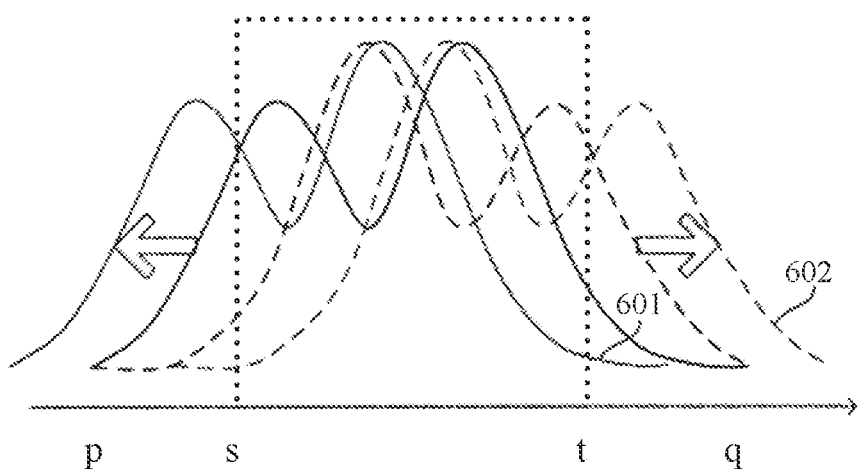
Figure 6C:
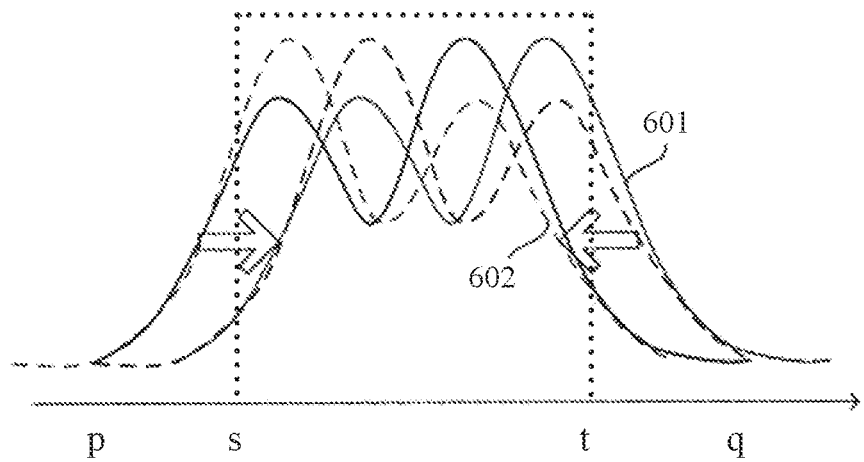

Referring now to FIGS. 5, 6A to 6C, a description will be given of the calculation of the image shift amount performed by the AF signal processor 204. FIG. 5 illustrates a correlation calculation area 504 that includes a focus detection pixel column 502 on the image sensor 201 and shift areas 503 on both sides of the focus detection pixel column 502. The focus detection pixel column 502 is an area in which these correlation amounts are calculated by the correlation calculation between the A image signal 601 and the B image signal 602 illustrated in FIG. 6A. The shift area 503 is an area necessary to shift the A image signal 601 and the B image signal 602 in the plus direction and the minus direction in order to perform the correlation calculation as illustrated in FIGS. 6B and 6C. In FIGS. 5 and 6A to 6C, p, q, s, and t represent horizontal coordinates, respectively, and p to q represent the correlation calculation area 504. Further, s to t represent the arrangement area of the focus detection pixel column 502.

In the next S402, the AF signal processor 204 relatively shifts the A image signal 601 and the B image signal 602 by one pixel (1 bit) in the plus or minus direction, and calculates the correlation amount between the A image signal 601 and B image signal 602. More specifically, it calculates the sum of the absolute values of the differences between the shifted A image and B image signals 601 and 602. The AF signal processor 204 calculates a correlation amount COR by the following expression (1), where i represents a shift amount, p−s represents a minimum shift amount, q−t represents a maximum shift amount, and x and y represent the start and end coordinates of the focus detection pixel column 502.

$$COR[i]\sum_{k=x}^{y}|A[K+i]-B[K-i]| \quad (1)$$

$$\{(p-s)<i<(q-t)\}$$

A single shift amount of the A image signal 601 and the B image signal 602 may be a plurality of pixels (such as two pixels).

Figure 7A:
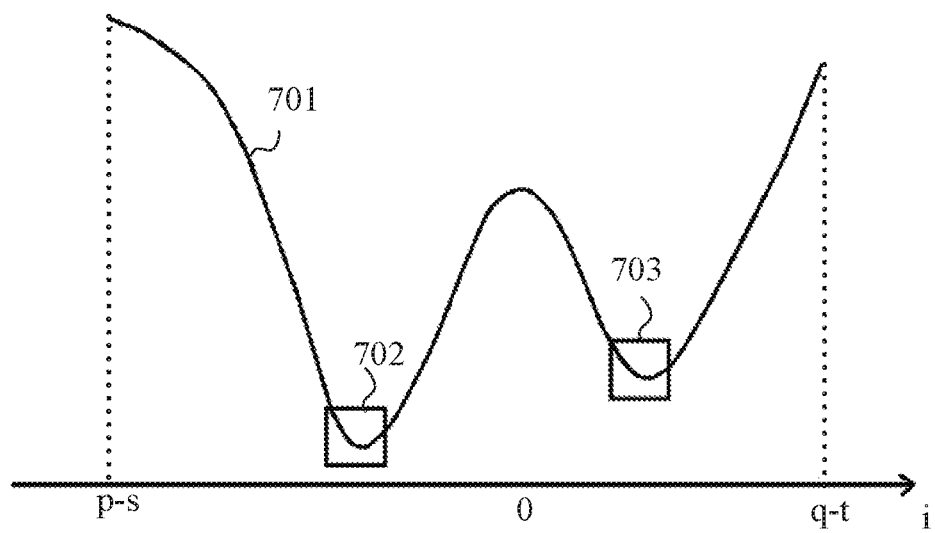
FIGS. 7A and 7B explain a relationship between a shift amount between the pair of phase difference AF signals and a correlation amount.

FIG. 7A illustrates an illustrative change in a correlation amount (COR) 701 for each shift amount. The abscissa axis indicates the shift amount, and the ordinate axis indicates the correlation amount. The correlation amount 701 has extreme values 702 and 703. The smaller the correlation amount 701 is, the higher the similarity degree or the higher the matching degree is between the A image signal 601 and the B image signal 602.

Next, in S403, the AF signal processor 204 calculates a correlation change amount from the difference between the correlation amounts obtained from, for example, shift amounts i−1 and i+1, among the correlation amounts 701 calculated in S402. More specifically, the correlation change amount ΔCOR is calculated by the following expression (2).

$$\Delta COR[i]=COR[i-1]-COR[i+1]$$

$$\{(p-s+1)<1<(q-t-1)\} \quad (2)$$

Figure 7B:
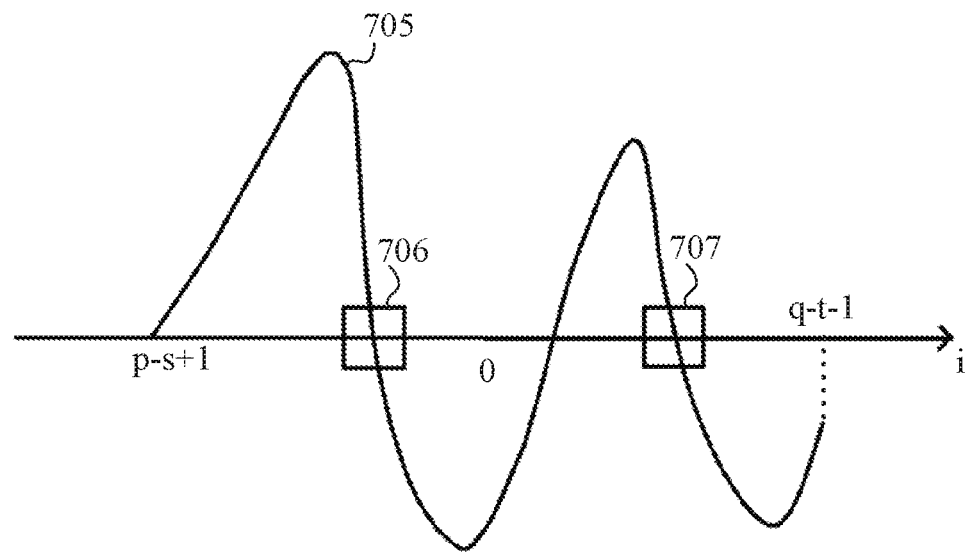

FIG. 7B illustrates an illustrative change in a correlation change amount (ΔCOR) 705 for each shift amount. The abscissa axis indicates the shift amount, and the ordinate axis indicates the correlation change amount. The correlation change amount 705 has zero cross points 706 and 707 when its value changes from plus to minus via zero. The correlation change amount is 0 when the coincidence degree between the A image signal and the B image signal is the highest. The shift amount when the correlation change amount becomes 0 is the image shift amount.

Figure 8A:
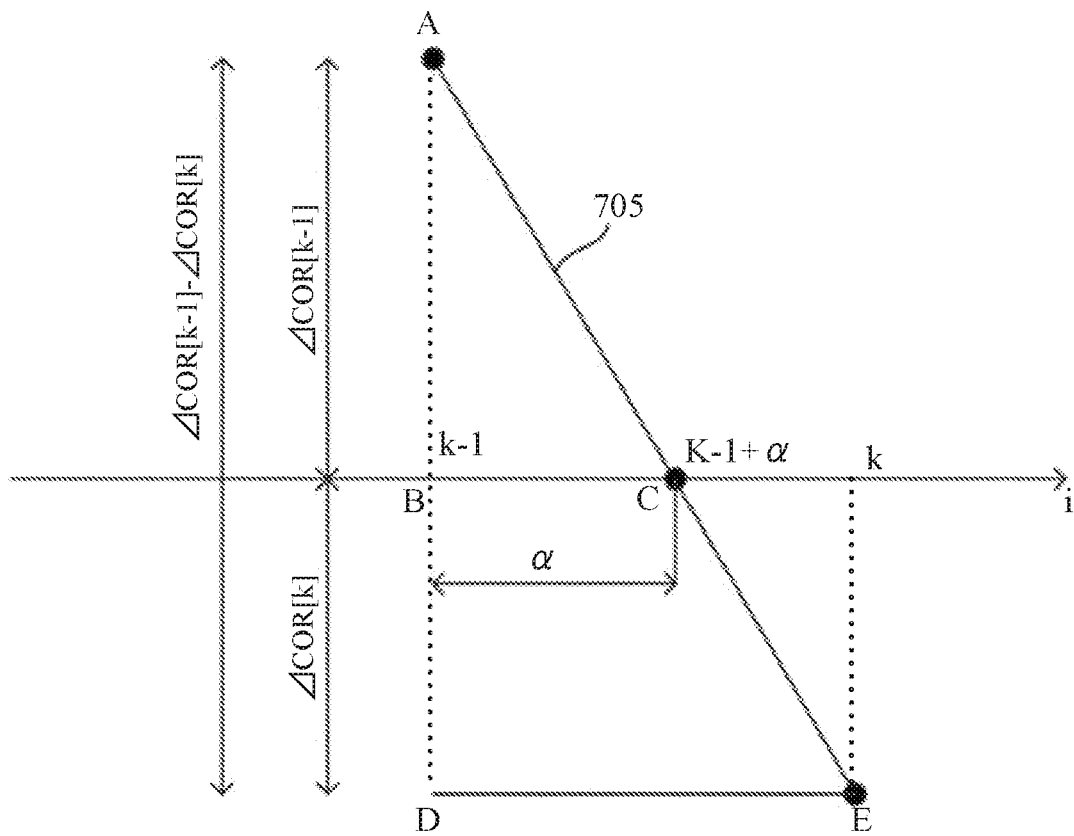
FIGS. 8A and 8B explain a relationship between the shift amount between the pair of phase difference AF signals and a correlation change amount.

FIG. 8A illustrates an enlarged correlation change amount 705 near the zero cross point 706 illustrated in FIG. 7B. In S404, the AF signal processor 204 calculates the image shift amount PRD by dividing it into an integer part β and a decimal part α. The AF signal processor 204 calculates the decimal part α from the similar relationship between the triangle ABC and the triangle ADE illustrated in the drawing and the following expression (3).

$$AB:AD = BC:DE \quad (3)$$

$$\triangle COR[K-1]:\triangle COR[k-1]-\triangle COR[k]=\alpha:k-(k-1)$$

$$\alpha = \frac{\triangle COR[k-1]}{\triangle COR[k-1]-\triangle COR[k]}$$

The AF signal processor 204 calculates the integer part β by the following expression (4) as illustrated in FIG. 8A.

$$\beta=k-1 \quad (4)$$

The AF signal processor 204 calculates an image shift amount PRD from the sum of α and β.

When there are a plurality of zero cross points 706 and 707 as illustrated in FIG. 7B, the AF signal processor 204 sets the zero cross point having the highest change steepness maxder in the correlation change amount at each zero cross point to the first zero cross point. The steepness maxder indicates that the higher the value is, the easier AF is performed. The AF signal processor 204 calculates the steepness maxder by the following expression (5).

$$\text{maxder}=|\Delta COR[k-1]|+|\Delta COR[k]| \quad (5)$$

Then, the AF signal processor 204 sets the shift amount giving the first zero cross point to the image shift amount PRD.

Next, in S405, the AF signal processor 204 calculates a defocus amount using the image shift amount calculated in S404. The AF signal processor 204 calculates a focus detection reliability that is an image shift amount or a reliability of the defocus amount. More specifically, it calculates the focus detection reliability as follows. The focus detection reliability calculation method described below is merely illustrative, and may be calculated depending on whether the object contrast and the plurality of past calculated defocus amounts (focus detection result) are continuous. In other words, when the object contrast is high or the defocus amount continuously changes, the focus detection reliability is made higher; and if the object contrast is low or the defocus amount discontinuously changes, the focus detection reliability is made lower.

Figure 8B:
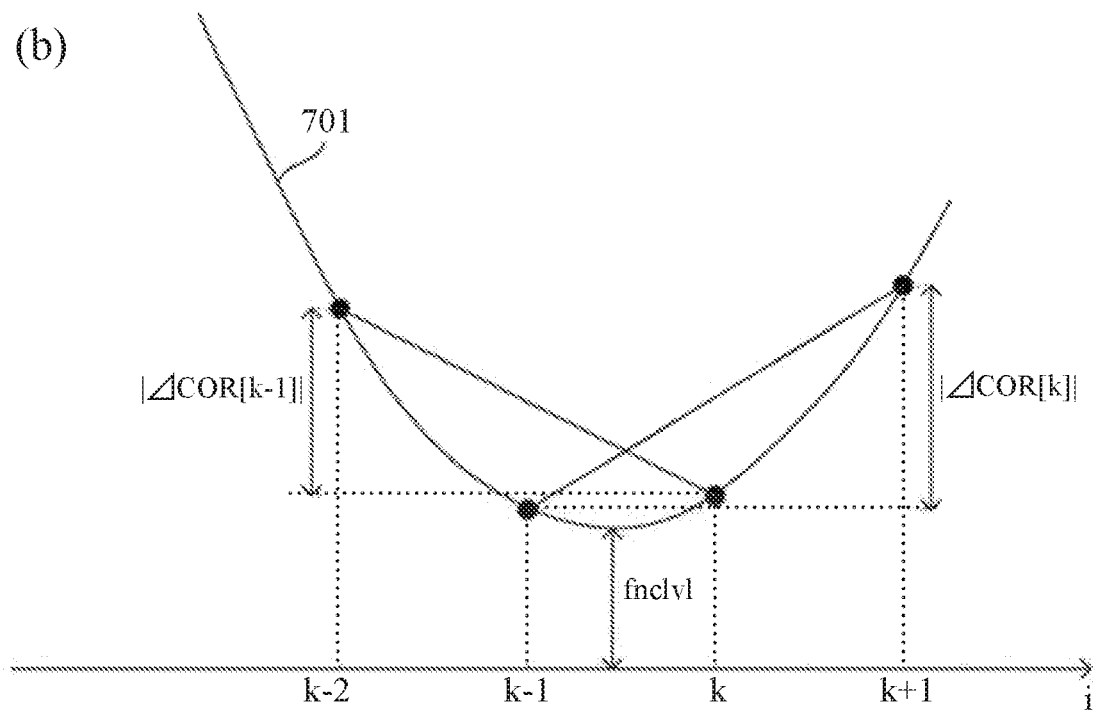

The AF signal processor 204 is defined as the change steepness maxder of in the correlation change amount described above and the two-image coincidence degree fnclvl which is the coincidence degree between the A image signal and the B image signal. The higher the value of the two-image coincidence degree is, the higher the accuracy of the image shift amount or the defocus amount is. FIG. 8B illustrates the enlarged correlation amount 701 near the extreme value 702 illustrated in FIG. 7A. The AF signal processor 204 calculates the two-image coincidence degree according to the following expression (6) according to the value of the steepness maxder.

(i) if $|\Delta COR[k-1]|\times 2\leq\text{maxder}$, $fnclvl=COR[k-1]+\Delta COR[k-1]/4$ (ii) if $|\Delta COR[k-1]|\times 2>\text{maxder}$, $fnclvl=COR[k]-\Delta COR[k]/4$ (6)

In S406, the AF signal processor 204 stores, as focus detection information, the defocus amount, focus detection reliability, and focus detection time for acquiring the A image and B image signals obtained in each focus detection pixel column in the memory circuit 215. Thus, the focus detection processing ends.

Figure 9:
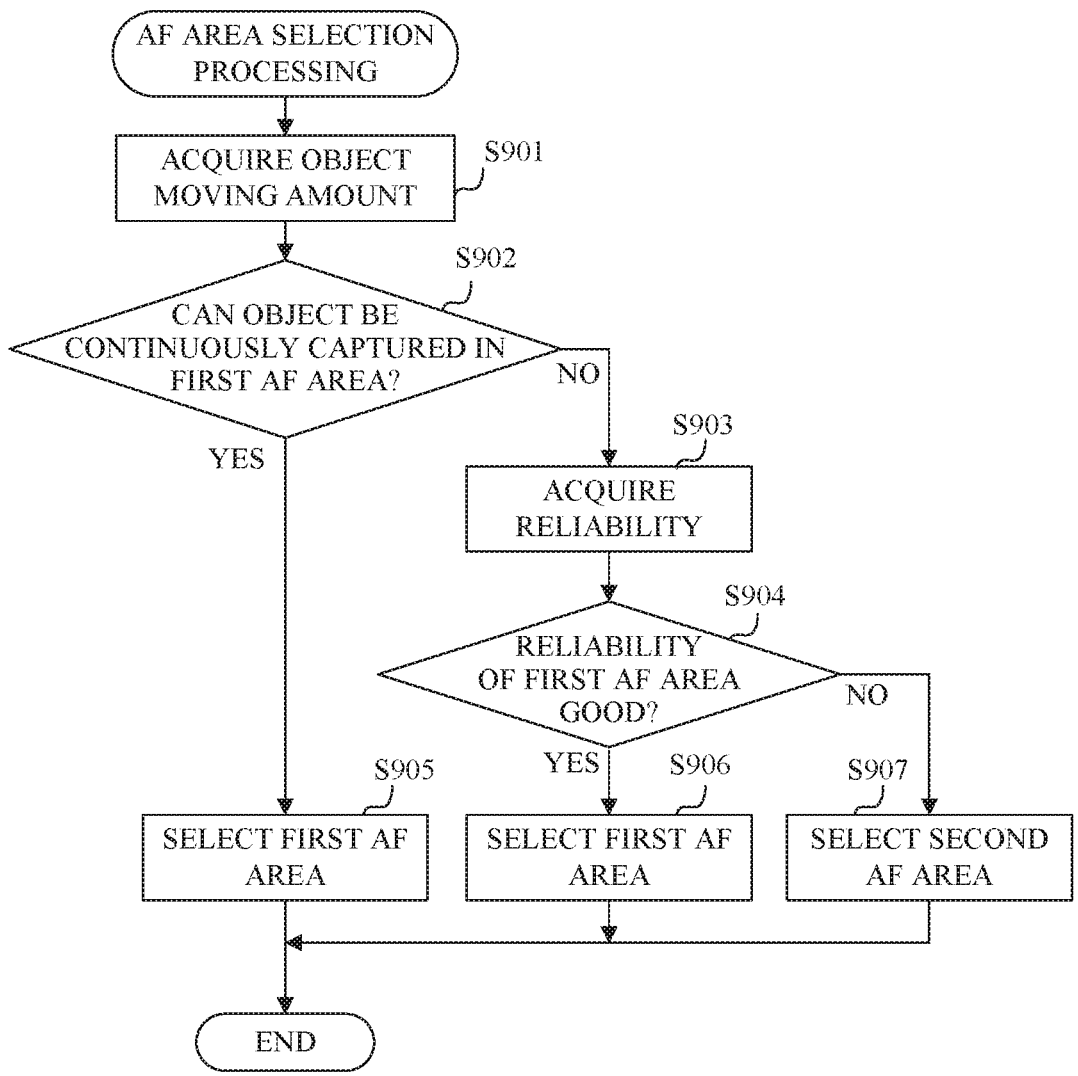
FIG. 9 is a flowchart illustrates AF area selection processing in imaging processing.

A flowchart in FIG. 9 illustrates the AF area selection processing performed in S303 in the imaging processing illustrated in FIG. 3. In S901, the camera controller 212 (object detector 2121) serving as an information acquiring unit acquires a moving amount of a specific object (or a moving object) detected in a predetermined number of frames or within a predetermined time in the imaging signal from the image input controller 203. The moving amount of the specific object is first information on whether or not the object moving within the imaging screen can be continuously captured in the first focus detection area.

In S902, the camera controller 212 serving as a determination unit can determines whether the user can (easily) continuously capture the specific object in the first AF area using the moving amount of the specific object acquired in S901. In other words, it determines whether or not the first information indicates that the specific object moving within the imaging screen can be continuously captured in the first AF area.

When the moving amount of the specific object is smaller than the predetermined value, the camera controller 212 determines that an object with little movement and can be (easily) captured in the first AF area that is a narrow area, proceeds to S905, and selects (sets) the first AF area as the use AF area. On the other hand, if the moving amount of the specific object is larger than the predetermined value, it determines that the specific object drastically moves and cannot (or hardly) be continuously captured in the first AF area, and proceeds to S903.

Whether or not the specific object can be continuously captured in the first AF area can be determined not only by the moving amount of the specific object within a predetermined time, but also by the shake detection result from the output of the gyro sensor (shake sensor) mounted on the camera body 20 or the lens unit 10. In other words, the shake amount of the imaging screen relative to the object can be acquired as the first information and can be determined based on the magnitude of the shake amount. More specifically, when the detected shake is smaller than a predetermined amount, it may be determined that the specific object can be continuously captured in the first AF area, and when the shake is larger than the predetermined amount, it may be determined that the specific target cannot be continuously captured in the first AF area.

Whether or not the specific object can be continuously captured in the first AF area may be determined by using the focal length information of the imaging optical system as the first information. More specifically, when the focal length is shorter than a predetermined length, it may be determined that the specific object can be continuously captured in the first AF area, and when the focal length is longer than the predetermined length, it may be determined that the specific object cannot be continuously captured in the first AF area.

In S903, the camera controller 212 acquires the focus detection reliability for the defocus amount calculated from the pair of phase difference AF signals from the focus detection pixel column in the first AF area and stored in the memory circuit 215 in S302.

Next, in S904, the camera controller 212 determines whether or not the focus detection reliability in the first AF area acquired in S903 is higher than a predetermined reliability. When the focus detection reliability is higher than the predetermined reliability, the camera controller 212 proceeds to S906, and selects the first AF area as the use AF area. On the other hand, when the focus detection reliability is lower than the predetermined reliability, the camera controller 212 proceeds to S907 and selects the second AF area as the use AF area. Thus, the AF area selection processing is completed.

Figure 10:
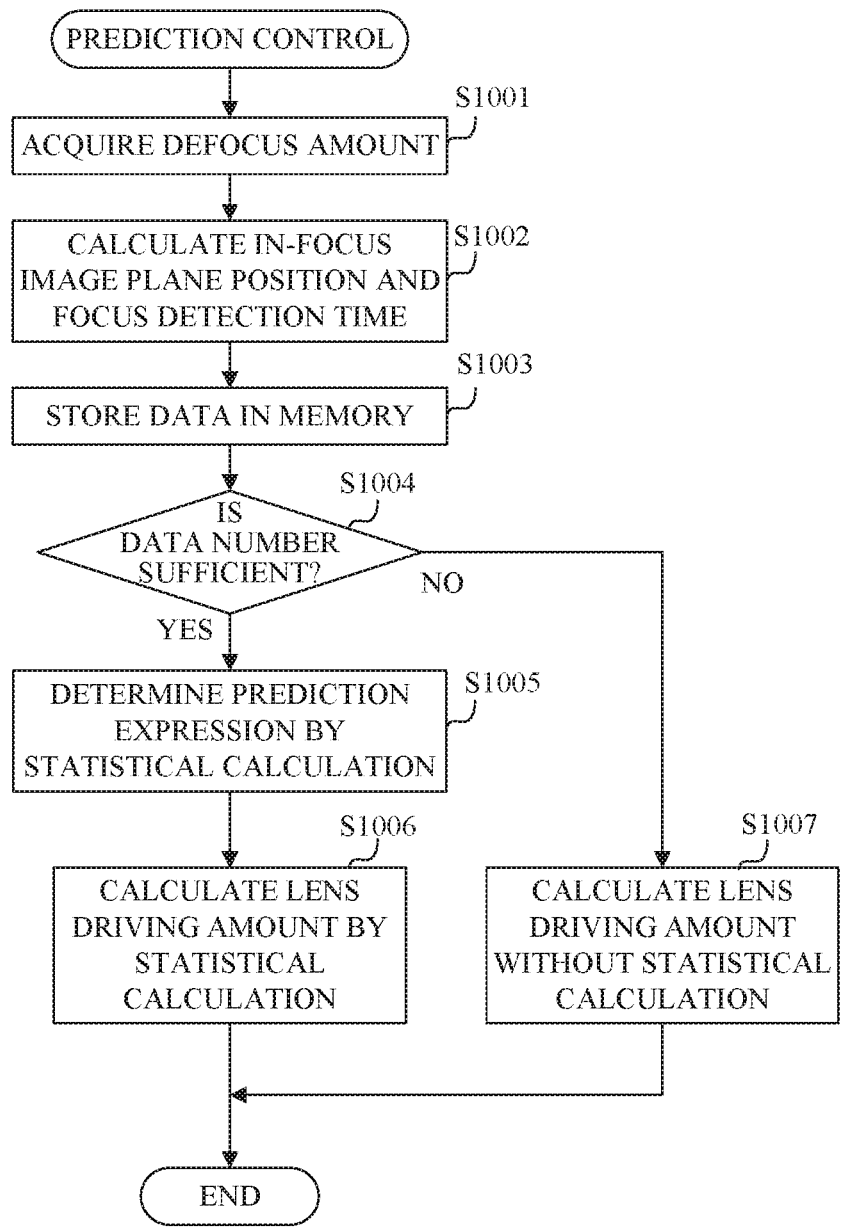
FIG. 10 is a flowchart illustrating prediction processing in imaging processing.

A flowchart in FIG. 10 illustrates the pre-imaging prediction processing performed in S304 in the imaging processing illustrated in FIG. 3. The pre-imaging prediction processing calculates (predicts) the in-focus image plane position at a future time from the change in the in-focus image plane position obtained from the plurality of past focus detection results and the focus detection times corresponding to the in-focus image plane positions. This embodiment predicts the in-focus image plane position at the future time using the statistical calculation. However, the in-focus image plane position at the future time may be predicted using another method.

First, in S1001, the prediction unit 2124 acquires the defocus amount in the use AF area (first or second AF area) selected in S303 among the defocus amounts stored in the memory circuit 215 in S302.

Next, in S1002, the prediction unit 2124 calculates the in-focus image plane position and the focus detection time corresponding to the acquired defocus amount. In general, a certain charge accumulation time is required until an output signal is obtained from the image sensor 201. Hence, the prediction unit 2124 sets the time between the charge accumulation start time and its end time (such as the central time) to the focus detection time. Then, the prediction unit 2124 calculates the in-focus image plane position by adding the acquired defocus amount to the current position of the focus lens 103.

Next, in S1003, the prediction unit 2124 causes the memory circuit 215 to store the calculated in-focus image plane position and the corresponding focus detection time data. The memory circuit 215 sequentially stores data of a predetermined number of in-focus image plane positions and focus detection times, and overwrites the oldest stored data with the latest data after the stored data reaches the predetermined number.

Next, in S1004, the prediction unit 2124 determines whether or not the number of data stored in the memory circuit 215 has reached a number necessary for the statistical calculation. The prediction unit 2124 proceeds to S1005 if the number of stored data is sufficient, and otherwise proceeds to S1007.

In S1005, the prediction unit 2124 determines a prediction expression for predicting the in-focus image plane position at the future time. This embodiment uses the prediction function f(t) illustrated in the expression (7) for the prediction expression. The prediction unit 2124 statistically determines the coefficients α, β, and γ in the expression (7) by the multiple regression analysis. In the expression (7), n is a value that minimizes a prediction error when the prediction is performed on samples in a plurality of representative moving object prediction imaging scenes.

$$f(t)=\alpha+\beta t+\gamma t^n \quad (7)$$

The prediction unit 2124 that has determined the prediction expression proceeds to S1006, calculates the in-focus image plane position at the predetermined future time using the expression (7), and calculates a driving amount of the focus lens 103 necessary to move the actual image plane position to the in-focus image plane position. Then, the calculated driving amount is transmitted to the lens controller 106 as the driving amount of the focus lens 103 at the predetermined future time. Thereby, the focus lens 103 is driven at the predetermined future time, and the actual image plane position is moved to the calculated in-focus image plane position.

On the other hand, in S1007, the prediction unit 2124 calculates the driving amount of the focus lens 103 from the defocus amount calculated without using the statistical calculation (or without the prediction), and transmits the calculated driving amount to the lens controller 106. Thereby, the focus lens 103 is driven in a direction for focusing on the object.

As described above, this embodiment selects the size of the use AF area according to whether or not the user can (easily) continuously capture the specific object that is a moving object in the use AF area Thereby, this embodiment can provide a stable AF operation while suppressing the object missing and perspective conflict for a small moving object or part of the object.

The above embodiment can perform a stable focus detection for a moving object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-015403, filed on Jan. 31, 2019 which is hereby incorporated by reference herein in its entirety.

What is claimed is:

1. A focus detection apparatus configured to perform a focus detection with a phase difference detection method for an object captured in a focus detection area in an imaging screen, the focus detection apparatus comprising
   at least one processor; and
   at least one memory coupled to the at least one processor storing instructions that, when executed by the at least one processor, cause the at least one processor to function as:
   a selection unit configured to select as the focus detection area a first focus detection area and a second focus detection area including the first focus detection area and its periphery;
   a focus detection unit configured to perform focus detection using a focus detection signal from the focus detection area selected by the selection unit; and
   an information acquiring unit configured to acquire first information on whether or not the object moving within the imaging screen can be continuously captured in the first focus detection area,
   wherein the selection unit selects the first focus detection area when the first information indicates that the object can be continuously captured in the first focus detection area, and the selection unit selects the second focus detection area when the first information indicates that the object cannot be continuously captured,
   wherein when the selection unit selects the second focus detection area, the focus detection unit performs the focus detection using a plurality of focus detection signals corresponding to areas each of which has the same horizontal size as that of the first focus detection area,
   wherein the focus detection unit acquires from the first focus detection area the focus detection signal generated using signals output from a first pixel area in an image sensor that captures an object image, and acquires from the second focus detection area the plurality of focus detection signals generated using signals output from a second pixel area in the image sensor, the second pixel area including the first pixel area and its periphery, and
   wherein the first pixel area includes first focus detection pixels capable of outputting the signals having phase difference, and the second pixel area includes second focus detection pixels different from the first focus detection pixels and capable of outputting the signals having phase difference, part of the second focus detection pixels being included in a portion of the first pixel area in the second pixel area.

2. The focus detection apparatus according to claim 1, wherein the selection unit acquires a reliability of a focus detection result with the first focus detection area, and
   wherein where the first information indicates that the object cannot be continuously captured, the selection unit selects the first focus detection area when the reliability is higher than a predetermined reliability, and selects the second focus detection area when the reliability is lower than the predetermined reliability.

3. The focus detection apparatus according to claim 2, wherein the selection unit acquires the reliability according to whether the focus detection result in the first focus detection area is continuous.

4. The focus detection apparatus according to claim 1, wherein the first information indicates whether a moving amount of the object within a predetermined time is smaller or larger than a predetermined amount, and
   wherein the selection unit selects the first focus detection area when the moving amount is smaller than the predetermined amount, and selects the second focus detection area when the moving amount is larger than the predetermined amount.

5. The focus detection apparatus according to claim 1, wherein the first information indicates whether a shake amount of the imaging screen for the object is smaller or larger than a predetermined amount, and
   wherein the selection unit selects the first focus detection area when the shake amount is smaller than the predetermined amount, and selects the second focus detection area when the shake amount is larger than the predetermined amount.

6. The focus detection apparatus according to claim 1, wherein the first information indicates whether a focal length of an imaging optical system is shorter or longer than a predetermined length, and
   wherein the selection unit selects the first focus detection area when the focal length is shorter than the predetermined length, and selects the second focus detection area when the focal length is longer than the predetermined length.

7. A focusing apparatus comprising:
   the focus detection apparatus according to claim 1, wherein the at least one processor functions as a control unit configured to perform a focusing control using a focus detection result by the focus detection apparatus.

8. The focusing apparatus according to claim 7, wherein the at least one processor further functions as a prediction unit configured to calculate an in-focus image plane position at a first future time using a plurality of past focus detection results, wherein the control unit performs the focusing control so that the actual image plane position moves to the in-focus image plane position at the first future time.

9. An imaging apparatus comprising:

an image sensor configured to capture an object image; and a focusing apparatus, wherein the focusing apparatus includes:

the focus detection apparatus according to claim 1, wherein the at least one processor functions as a control unit configured to perform a focusing control using a focus detection result by the focus detection apparatus.

10. A focus detection method configured to perform a focus detection with a phase difference detection method for an object captured in a focus detection area in an imaging screen, the focus detection method comprising:

a selection step of selecting as the focus detection area a first focus detection area and a second focus detection area including the first focus detection area and its periphery;

a detection step of performing focus detection using a focus detection signal from the focus detection area selected in the selection step; and an acquisition step of acquiring first information on whether or not the object moving within the imaging screen can be continuously captured in the first focus detection area, wherein the selection step selects the first focus detection area when the first information indicates that the object can be continuously captured in the first focus detection area, and the selection step selects the second focus detection area when the first information indicates that the object cannot be continuously captured, and wherein when the selection step selects the second focus detection area, the focus detection unit performs the focus detection using a plurality of focus detection signals corresponding to areas each of which has the same horizontal size as that of the first focus detection area, wherein the detection step acquires from the first focus detection area the focus detection signal generated using signals output from a first pixel area in an image sensor that captures an object image, and acquires from the second focus detection area the plurality of focus detection signals generated using signals output from a second pixel area in the image sensor, the second pixel area including the first pixel area and its periphery, and wherein the first pixel area includes first focus detection pixels capable of outputting the signals having phase difference, and the second pixel area includes second focus detection pixels different from the first focus detection pixels and capable of outputting the signals having phase difference, part of the second focus detection pixels being included in a portion of the first pixel area in the second pixel area.

* * * * *